July 20, 1954　　　R. W. SCHULTZ　　　2,684,107
METHOD AND APPARATUS FOR PROCESSING FIBROUS MATERIALS
Filed May 20, 1952　　　4 Sheets-Sheet 1

FIG-1

INVENTOR:
ROBERT W. SCHULTZ.
BY
ATTORNEYS

July 20, 1954  R. W. SCHULTZ  2,684,107
METHOD AND APPARATUS FOR PROCESSING FIBROUS MATERIALS
Filed May 20, 1952  4 Sheets-Sheet 2

INVENTOR:
ROBERT W. SCHULTZ.
BY
ATTORNEYS

Patented July 20, 1954

2,684,107

UNITED STATES PATENT OFFICE 2,684,107

METHOD AND APPARATUS FOR PROCESSING FIBROUS MATERIALS

Robert W. Schultz, Newark, Ohio, assignor to Owens-Corning Fiberglas Corporation, a corporation of Delaware Application May 20, 1952, Serial No. 288,814

18 Claims. (Cl. 154—27)

This invention relates to method and apparatus for processing of forming fibrous material into predetermined shapes for particular uses and installations, as a compact package of fibrous material and as an intermediate formation preparatory to further processing of the material.

Fibrous materials or mats of fibrous materials have been used for various insulation purposes, one of which is the covering of pipes or tubes containing heated or cooled fluids, the insulation on the pipes functioning to avoid as far as possible the transmission of heat to or from pipes conveying fluids such as refrigerants, steam, hot water, chemicals, or other fluids at differential temperatures relative to a surrounding environment.

Mats of mineral materials have been found to be ideally adapted for such purpose as they are not subject to weather deterioration, are verminproof and fireproof. Fibers attenuated from molten glass, slag or rock, when interfelted into a haphazard mass, have been used for the above-mentioned purposes. Heretofore, in the fabrication of pipe-covering sections from such materials, the covering sections have been made in semiannular configuration in cross-section, pairs of mating sections enclosing a pipe providing excellent insulation therefor. The semiannular sections have heretofore been formed by inserting one or more planar mats of fibers impregnated with an uncured bonding resin into or between the dies in a suitable press, the dies being brought together upon the mats to configurate the same to the desired shape and held in such position during a period of the application of curing heat to set the bonding resin. The semiannular configuration impressed in the fibrous mat is fixed by the bonding characteristics of the cured resin. In order to assure the formation of a satisfactory pipe-covering section in the dies, it has heretofore been necessary to utilize a fibrous mat of greater lateral dimension than that of the dies to adequately fill the dies with the fibrous material. Such method of forming the semiannularly shaped sections necessitates a considerable loss of fibrous material as the excess projects laterally of the dies as "flash" which must be trimmed away as waste. This method of manufacture is uneconomical not only from the standpoint of waste but few sections may be formed and cured at one operation and extensive manual handling of the material has been necessary.

Another method that has been used in forming molded sections of fibrous pipe covering consists in fitting a length of planar fibrous mat between molds having sinusoidal interior contours and curing the material while in such molds by the application of heat whereby the mat will be set by the resin bond in the shape imparted to the mat in the molds. A mold of this character is shown, for example, in the Collins Patent No. 2,288,072 granted June 30, 1942.

Heretofore in utilizing molds of the character shown in the Collins patent, the operation necessitated the manual placement of mat in the molds, a difficult task because it has been virtually impossible to cause the mat to follow the mold configuration without causing unequal stresses therein and resulting in a nonuniform product having zones of varying densities, a condition impairing the insulating value of the end product. In placing a planar section of fibrous mat in such molds it is usually necessary to employ a relatively thick mat which is compressed when the molds are brought together, and if the mat is not distributed uniformly, the end product will not be of a uniform character.

The present invention has for an object the provision of a method and apparatus for preconfigurating or folding a fibrous mass or mat of material in a manner facilitating its subsequent processing in forming sections of insulation especially adapted for covering pipes, tubes or other similar articles.

An object of the invention resides in a method of compressing a continuous mass of fibrous material and folding the material upon itself to form a plurality of adjacent laps of a dimension such that when the folded material is disposed in a sinusoidal-shaped mold, the preformed mat accurately conforms to the contour of the mold.

Another object of the invention resides in a method wherein a fibrous mat is compressed concomitantly with a folding operation to provide a preformed mat of desired density suitable for insulating purposes and for imparting a degree of springiness or resiliency to the formed mat which enables it to better conform to the configuration of the mold.

Another object of the invention resides in the provision of an apparatus for compressing a mass of fibers to a mat formation and of retroflexing or folding the mat upon itself to provide a compact package of compressed mat of continuous length disposed in contiguous laps or layers to facilitate subsequent fabrication or molding of the mat or to provide a compact package which may be easily handled or transported.

Another object of the invention resides in the provision of an apparatus for concomitantly compressing a mass of fibers and continuously advancing and controlling the direction of movement of the mat to provide successive folds and contiguous layers thereof of predetermined dimension, the apparatus including adjustable means for forming the laps or folds of different dimensions to adapt the material for forming insulating sections of various sizes or for other uses and purposes.

Still another object of the invention resides in an apparatus for effecting relative movement between a mat-feeding means and a collecting means wherein the mat is collected in an assemblage of successive laps in compacted relation.

Another object of the invention resides in a method of advancing a continuous mat of mineral fibers and folding and lapping the mat upon itself to form a rectangular package and of securing the mat in package form by a destructible fastening means.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

While the invention has particular utility in performing operations upon a mat or mats formed of masses of mineral fibers, such as glass fibers, it is to be understood that the method and apparatus may be used for folding and lapping various kinds of materials in strip or mat configuration.

The method and apparatus of the present invention have particular utility for compacting and folding a length or lengths of fibrous material into a plurality of successive folds of serpentine configuration providing a compacted package of fibers which is particularly adapted for subsequent molding or processing to form pipe-covering sections or the like. The apparatus of the invention is especially adapted for feeding a mat to a folding zone where the mat is caused to be moved successively in opposite directions with respect to the mat supply whereby the material is retroflexed and collected in successive layers or folds. The apparatus is inclusive of means for regulating the length of the successive layers or folds to produce compacted packages of folded mat of different sizes or for adapting the folded mat to a desired size for subsequent processing or molding operations. The adjustable character of the apparatus facilitates the folding of a resin impregnated fibrous mat to desired sizes suitable for subsequent curing or fixation in a matrix or mold for producing pipe-covering sections or similar manufactures.

Sections of the folded and lapped mat may be individually enveloped by a suitable band, length of paper or other readily disruptible fastening means utilized to maintain the folded mat in rectangular package configuration, a form facilitating the stacking of packages in a minimum of storage space.

Figure 1:
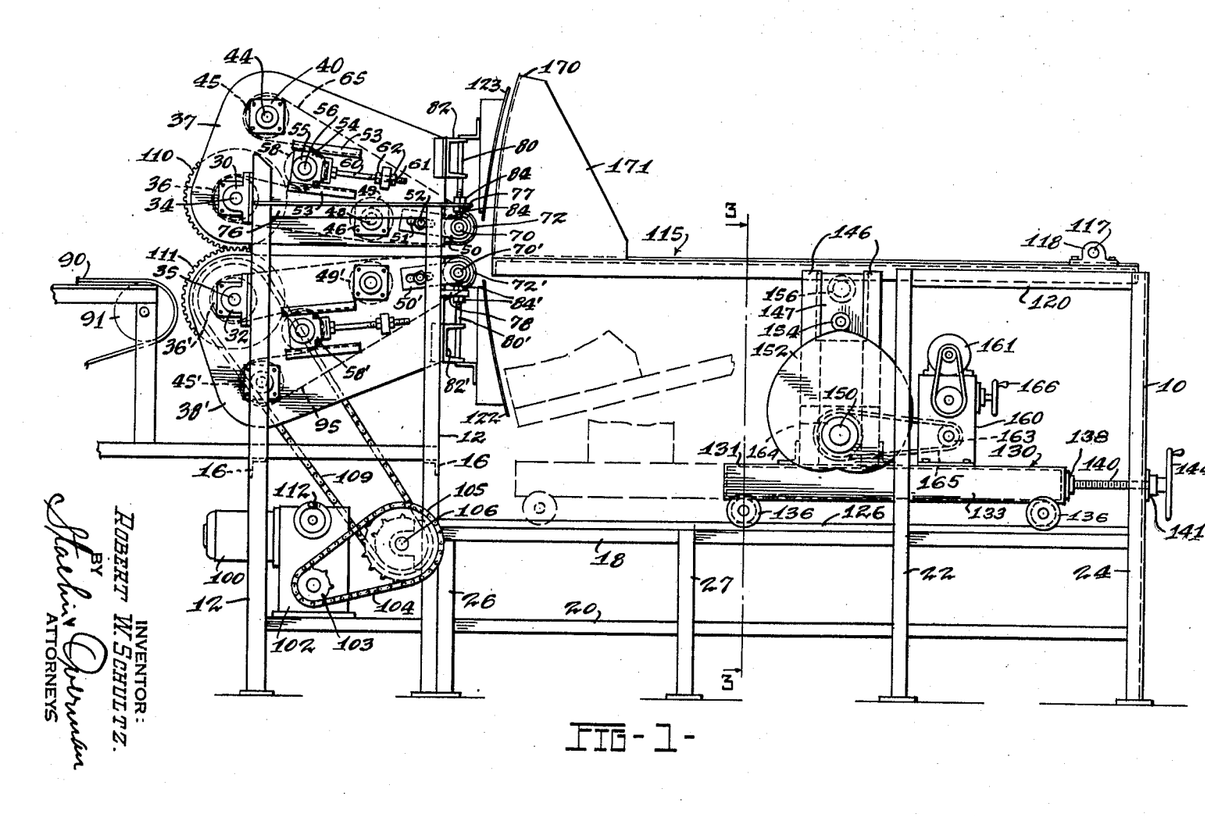
Figure 1 is a side elevational view illustrating a form of apparatus for carrying out the method of the invention.
Figure 2:
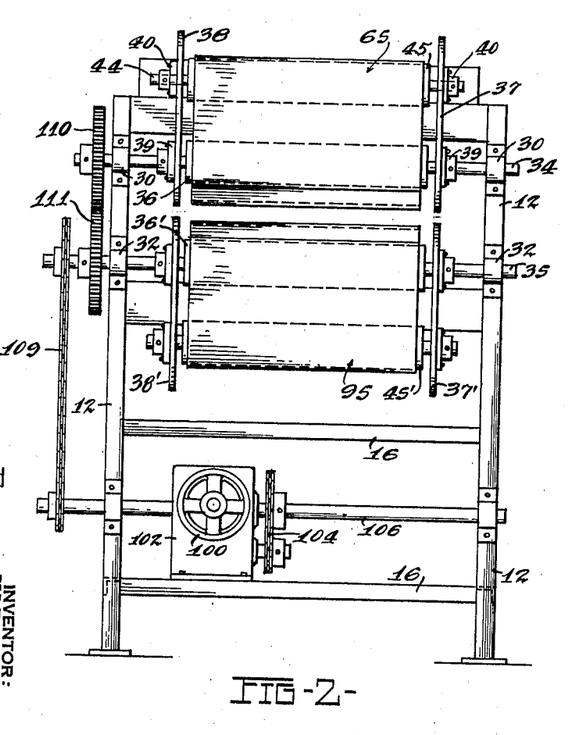
Figure 2 is an end view of the apparatus illustrated in Figure 1.
Figure 3:
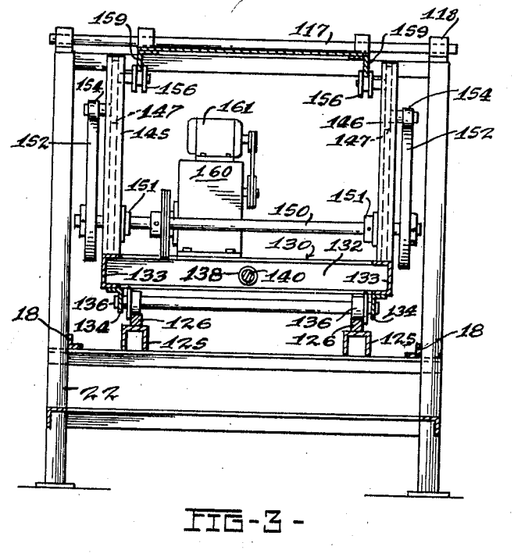
Figure 3 is a transverse vertical sectional view through the apparatus, the view being taken substantially on the line 3—3 of Figure 1.
Figures 4, 6:
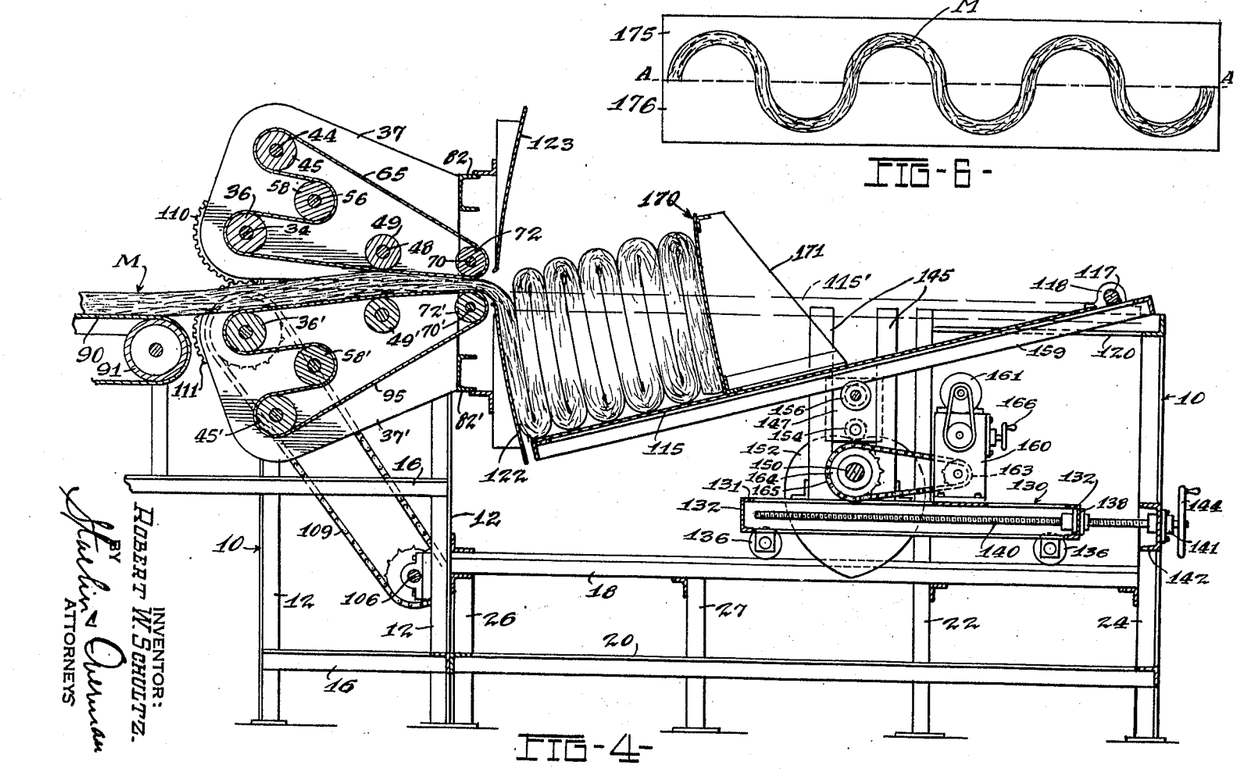
Figure 4 is a longitudinal sectional view through the apparatus illustrated in Figure 1.
Figure 6 is a sectional view illustrating an apparatus for use in further processing the folded mat to form insulating sections for pipe covering purposes.

Referring to the drawings and especially Figures 1 through 4, there is illustrated a form of apparatus of the invention which is inclusive of a frame structure 10 embodying two pairs of main upwardly extending posts or uprights 12 which are joined together by transversely extending bars 16. Projecting in a righthand direction as viewed in Figures 1 and 4 is a plurality of longitudinally extending members 18 and 20 which are associated with additional pairs of uprights or posts 22 and 24. The longitudinally extending members 18 and 20 are additionally supported by pairs of short posts 26 and 27.

The apparatus includes means for conveying or advancing a mat or a plurality of contiguously disposed mats of mineral fibers such as glass fibers, said mat-advancing means also being adapted and arranged to compress the mat or mats of fibers as the same is delivered to the folding station. The mat-feeding and compressing arrangement is adaptable to accommodate one or more fibrous mats dependent upon the thickness or density desired in the end product. The mat-advancing and compressing apparatus is preferably of a character utilizing tensioned belts or members of the endless type driven by a suitable means, the relative positions of the belts being adjustable to vary or modify the degree or extent of compression of the fibers.

As particularly shown in Figure 1, pairs of bearing blocks 30 and 32 are secured to one pair of uprights 12 and form journals which revolubly support transversely extending shafts 34 and 35, the shaft 34 supporting a roller 36. Mounted upon the shaft 34 in transversely spaced relation is a supplemental frame including a pair of spaced parallel plates 37 and 38 to which are secured bearing blocks 39 carried by the shaft 34. Secured to the plates 37 and 38 are journal blocks 40 supporting bearings in which is revolubly journaled a shaft 44 carrying a roller 45. Also secured to the plates 37 and 38 are journals 46 which revolubly support a shaft 48 carrying a roller 49.

Members 50 mounted on the plates 37 and 38 are provided with bearings supporting a shaft 70 carrying a roller 72. The members 50 are preferably adjustable relative to the plates 37 and 38 to change the position of the roller 72. To provide an adjustment, the members 50 may be formed with slots 51 cooperating with bolts 52 which may be drawn up to hold the members in adjusted position.

A mat-engaging means such as an endless belt 65 is supported by the rollers 36, 45, 72 and 49 as particularly shown in Figures 1 and 4.

Means carried by plates 37 and 38 is provided for maintaining a desired degree of tension in the belt 65. Each of the plates 37 and 38 is equipped with a pair of ways 53 between which is slidably disposed a crosshead 54, each of the cross heads being formed with a journal 55 supporting a shaft 56 carrying an idler roller 58. Secured to each of the crossheads 54 is a threaded rod 60 which extends through a projection 61 formed on the supporting plate. The rod 60 is provided with adjusting nuts 62 by means of which the position of the shaft 60 and hence that of the roller 58 may be varied for the purpose of tensioning the conveyor or belt 65.

The mat-conveying means carried by the plates 37 and 38 is adjustable about the axis of the shaft 34 for the purpose of regulating the extent of compression of the mat or mass of fibers advanced by the conveyor and hence the thickness of the mat delivered to the collecting zone.

In the embodiment illustrated, the frame structure is inclusive of side members 76 joining the pairs of uprights or posts 12 of the frame, the members 76 having extending portions 77 which are bored to respectively accommodate threaded shafts or rods 80. The upper portions of the rods 80 extend through openings in the side walls of a channel-shaped member 82 which joins the plates 37 and 38, the rods being welded or otherwise secured thereto. Disposed above and below the portions 77 of the frame members 76 are threaded nuts 84 which may be manipulated to cause the plates 37 and 38 to be pivotally moved about the axis of the supporting shaft 34 causing the rollers 49 and 72 to be elevated or lowered, depending upon the direction of manipulation of the nuts 84.

The mat-compressing and conveying means includes a second unit of a construction similar to the unit involving the conveyor 65 above described which is disposed immediately beneath the conveyor unit 65. The construction includes a frame assembly formed of plates 37' and 38' and an endless belt 95 which is supported upon rollers 45', 36', guide rollers 49' and 72' mounted upon shafts journaled in bearings carried by the plates 37' and 38', the belt 95 overtaking a roller 58' which is adjustably supported to maintain proper tension upon the belt or conveyor 95 by means of tension means of substantially identical construction of that associated with the roller 58. The roller 72' is carried upon a shaft 79' mounted in bearings supported by members 50' adjustably supported on the plates 37' and 38'. The frame posts or uprights 12 adjacent the roller 72' are provided with projections 78 bored to accommodate threaded rods 80', the rods 80' being welded to a member 82' connecting the plates 37' and 38'. Nuts 84' are threaded upon each rod 80' for engagement with the adjacent projection 78 to adjust the relative vertical position of the roller 72' and hence the relative position of the mat-engaging upper flight of the conveyor belt 95.

The conveyor belts 65 and 95 are adapted to be driven whereby the adjacent mat-engaging flights thereof move in the same direction whereby a mat M delivered between the lower flight of the belt 65 and the upper flight of the belt 95 is conveyed in a righthand direction as viewed in Figure 4, through the gap between the rollers 72 and 72', the relative position of the rollers 72 and 72' determining the extent or degree of compression of the mat as it is advanced between the conveyors 65 and 95.

The mat-conveying devices are driven by suitable means, as for example, a motor 100 which operates a speed-controlling mechanism contained within a housing 102. A sprocket 103 journaled on the housing 102 and operated through the gearing contained therein is connected by a chain 104 with a driven sprocket 105 journaled upon a shaft 106 carried in bearings supported by the machine frame. Mounted upon shafts 35 and 106 are toothed sprockets connected by means of a chain 109 establishing a drive to the shaft 35 and roller 36' from the motor 100. Mounted upon shafts 34 and 35 are spur gears 110 and 111 intermeshed as shown in the Figure 1 establishing a drive for both belt conveyors 65 and 95. The rate that the mat is advanced by the conveyor devices may be regulated or controlled by varying the drive ratio through adjustable speed-changing mechanism contained in the housing 102 manipulated by a handwheel 112.

The lower flight of the belt 65 and the upper flight of the belt 95 are adjusted to a desired angular relationship by adjustment of the belt-supporting frames through manipulation of the nuts on the rods 80 and 80' to compress the mat to a required thickness at the same time that it is advanced toward the collecting zone by the belts. The rollers 49, 49', 72 and 72' resist the thrust of the mat-compressing action of the belts or conveyors.

The mass of fibrous material or mat M may be delivered to the mat-compressing and advancing mechanism by a conveyor 90 supported by rollers 91 (one of which is shown in Figures 1 and 4) from a supply or directly from a fiber-forming apparatus. Prior to its delivery to the mat-conveying or compressing apparatus of the present invention, the mat M is impregnated or treated with a suitable binding resin preferably of the heat-curable type such as phenolformaldehyde where the mat is eventually processed into a fixed shape or form such as pipe-covering sections. It is to be understood that unimpregnated or untreated fibrous masses may be compressed and folded upon the present apparatus, or other impregnants imparted to the fibrous mass depending upon their ultimate use, utility or further processing.

The arrangement of the invention includes a mat-folding and collecting zone or station disposed adjacent the mat-compressing and conveying mechanism, the zone having a mat-collecting means arranged for movement relative to the mat-conveying mechanism for successively retroflexing the mat in alternate directions whereby successive laps or layers of the mat are collected in compact rectangular orientation or package.

To this end, the apparatus is provided with a mat-collecting means including a uniplanar-surfaced platen or table 115 which may be pivotally supported at one end upon a shaft 117 carried by journal blocks 118 supported upon longitudinally extending members 120 of the frame 10. The table or platen 115 is adapted to be oscillated about the axis of shaft 117 to provide for the reception of successive layers or laps of the mat and to cooperate with the mat-feeding and compressing means for retroflexing the mat into successive, contiguously arranged layers or laps.

The channels 82 and 82' of the supplemental frames supporting the conveyors 65 and 95 respectively support mat guides, walls or abutments 122 and 123 which are preferably arranged in relative angular positions as shown in Figure 4. The guide walls are preferably slightly curved to coincide generally with the curved path of movement of the end of the platen 115 to facilitate the lapping or folding of the mat. When the table 115 is in a downwardly inclined position as shown in Figure 4, the end lap of the advancing mat is in engagement with the abutment wall 122. As the table 115 is moved upwardly about the pivotal axis of shaft 117, the succeeding lap of the advancing mat engages and moves upwardly along the abutment wall 123.

The apparatus is inclusive of means for continuously oscillating the mat-collecting platen or table 115, such means being of an adjustable character for varying the extent of oscillation. In the embodiment illustrated, the frame 10 is provided with a pair of parallel members 125 of channel shape in cross-section supporting rails or ways 126 providing a track or support for a carriage 130. The carriage includes a base or body 131 formed of sets of interconnected channel-shaped members 132 and 133. Secured to members 133 are two sets of depending brackets 134, each set journally supporting an axle equipped with flanged wheels 136. The carriage 130 is adapted for longitudinal traverse of the track formed by rails 126, and means is provided for adjusting the position of the carriage for the purpose of varying the extent of oscillatory movement of the mat-receiving platen 115. One of the members 132 supports a relatively stationary threaded bushing 138 into which is threaded a shaft 140. The shaft 140 projects through and is journally supported by a member 141 secured to a transversely extending frame member 142, a handwheel 144 being secured to the end of the shaft. By rotating the handwheel 144, the shaft 140 may be threaded longitudinally of the bushing 138 whereby the carriage 130 may be moved in either direction longitudinally of the rails 126.

Mounted upon the channel members of the body 131 are pairs of vertically disposed members 145 and 146, the members of each pair being of cross-sectional contour providing ways or guides accommodating slidably mounted crossheads or plates 147. Disposed beneath the crossheads and extending transversely of the carriage body 131 is a shaft 150 journaled in bearings 151 carried by the members 145 and 146. Mounted upon the extremities of the shaft 150 are cams 152, preferably of the uniform motion type, that is, a cam having constant increments in radial dimension for equal increments of rotative movement, sometimes referred to as "heart-shaped" cams. Each of the crossheads 147 is provided with a cam follower or roller 154 respectively engaging the cam surfaces of cams 152. Also secured to the crossheads or plates 147 are rollers or members 156 which engage the downwardly extending walls of L-shaped members 159 secured to the mat-receiving table 115.

Also mounted upon the carriage body 131 is a housing 160 enclosing suitable speed-reducing gearing driven by a motor 161, the gearing transmitting power to the shaft 150 by means of sprockets 163, 164 and a driving chain 165. The speed-changing mechanism contained within the housing 160 may be controlled by manipulation of a handwheel 166.

Through the mechanism above described the table 115 may be oscillated about its pivotal support by energization of the motor 161 which drives the speed-changing ratio gearing and thence the shaft 150 through the chain 165. Rotation of shaft 150 causes the cams 152 to actuate the followers 154 and crossheads 147 causing the rollers 156 to oscillate the table 115 about the shaft 117. By means of the constant increment cams 152, the table will be moved in an upward direction (counterclockwise) at a substantially constant rate during one half revolution of the cams, moving the table from its lowermost position as shown in Figure 4 to a substantially horizontal position shown in Figure 1. During the next 180° of rotation, the table is moved to its lowermost position. While the zone of engagement of the rollers 156 with the table-supporting members varies slightly by reason of the pivotal movement of the table about the axis of shaft 117, the resulting minor variation in rate of movement of the extremity of the table at the mat-folding zone does not impair the successful retroflexing of the mat into laps or layers of equal length. This result is accomplished without subjecting the fibers to undue stresses during the folding and lapping operations.

By modifying or changing the extent of oscillation or swing of the table 115, the length of the layers or laps of the collected mat may be varied. The stroke of and hence the included angle of oscillation of the table 115 may be changed by rotating the handwheel 144 and shaft 140 thereby threading the latter through the nut 138 causing the carriage 130 and table-actuating mechanism to move longitudinally of the table. By thus changing the relative position of engagement of the rollers 156 with the table 115, the extent of oscillatory movement of the table may be varied and in this manner the length of the folds or laps of the collected mat may be changed. By shifting the carriage 130 in a righthand direction as viewed in Figures 1 and 4, the throw or oscillation of the table 115 may be increased to form folds or laps of greater length or height while movement of the carriage 130 in a lefthand direction reduces the amplitude of the oscillation of the table and hence proportionately reduces the height or length of the contiguous laps or folds of the mat collected upon the table.

In the operation of the apparatus, the carriage 130 is adjusted to obtain an oscillatory movement of the table 115 by operation of the motor 161 to form folds or laps of desired length while the mat-feeding and compressing devices are continuously actuated through the operation of the motor 100. The speed-controlling mechanisms within the housings 102 and 160 are regulated by manipulation of the handwheels 112 and 166 to properly correlate the speed of advance of the mat by movement of the mat-conveying belts 65 and 95 with the vertical movement of the table to cause a folding of the mat into contiguous laps, as illustrated in Figure 4. For proper operation of the apparatus, the mat M should be advanced at a linear speed substantially equal to the substantially vertical linear travel of the end of the table 115 at which zone the mat is being collected.

In initiating the operation of folding a mat, it is desirable to provide means in the form of a movable abutment to hold the first-formed laps of the mat in vertical relation. In the apparatus disclosed, an abutment plate 170 provided with rearwardly extending flanges 171 for supporting the plate upon the table 115 is adapted to be disposed at the lefthand end of the table 115 as viewed in Figure 1 during the starting of mat-folding operations. The plate or abutment 170 is slidable along the table 115 so that as succeeding folds or laps of mat are collected upon the table, the plate 170 is moved along the table by the accumulating mat. It has been found in actual practice that after the formation of two or three laps of mat the abutment plate 170 may be removed from the table until required at an initial starting operation.

The apparatus of the present invention is especially suited for precompressing and prefolding fibrous mat to adapt the same for subsequent processing into semiannular shapes such as those used for pipe-covering sections. In forming pipe-covering sections, a pair of matrices or molds 175 and 176 of the character diagrammatically disclosed in Figure 6 are employed to mold the mat into the undulated or sinuous form illustrated. The length of the layers of the folded mat collected on the table 115 is sufficient to permit the material to be disposed between the matrices 175 and 176 into the sinuous form without stretching or distorting the mat. Thus the operator may sever a required quantity of mat collected on the table 115 by a suitable mat-severing means (not shown) and dispose the folds or bends at the ends of contiguous laps in the semiannular depressions formed by the matrices. For example, in the illustration shown in Figure 6, a mat section having a length of six laps of material would fit in the six semiannular depressions in the matrices as the lengths of the folds formed during the mat-folding and collecting operation are of the correct aggregated dimension to fit the sinuous form between the matrices without stretching or crowding the fibers. As the fibrous material, prior to its delivery into the mat-feeding devices or belts 65 and 95, has been impregnated with a curable or settable resin such as phenolformaldehyde, the impregnated mat section or bat enclosed in the matrices 175 and 176 may be readily cured by inserting the matrices and mat assembly of Figure 6 into a suitable curing oven or otherwise subjecting the matrices and mat to other curing medium for setting the binder or impregnant. After the binder has been set, the cured undulated mat may be cut along the line AA of Figure 6 to form a plurality of individual semiannular sections of insulating material which, when matched in pairs, is adapted to snugly enclose pipe of a desired size. Thus by mating pairs of the molded semiannular sections, pipe-covering sections may be produced without any waste of mat material. It is to be understood that the molds or matrices 175 and 176 may be fabricated with any desired number of undulations, dependent upon the number of pipe-covering sections desired to be formed and cured in one set of molds.

Thus by prefolding the mat in the manner of the present invention, the mat may be readily inserted in the pipe-covering forming molds without stressing or drafting of the fibers by the ridges of the corrugations of the mold configuration. Furthermore, the precompression of the mat not only reduces the mat to the desired thickness but facilitates the handleability of the mat section. The compression of the mat imparts a degree of resiliency or springiness thereto that enables the mat or bat to readily assume the sinuous form when placed in the corrugated molds.

For different sizes of pipe covering, the height or length of the layers or laps in the collected mat may be varied by adjusting the extent of the throw or oscillatory movement of the table 115 and the use of molds of a proper size to accommodate the folded material. It is to be understood that the fibrous material delivered to the apparatus of the invention may be a single layer or a plurality of layers or laminations dependent upon the characteristics of the fibrous material or those desired in the end product.

Figure 7:
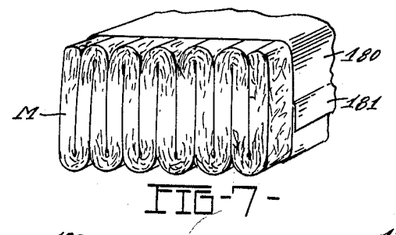
Figure 7 illustrates a package formed of the folded mat produced through the utilization of the method and apparatus of the invention.

The folded or lapped collected mat deposited upon the table 115 may also be packaged as a continuous bundle of mat as shown in Figure 7. Thus an operator may form a package of mat of desired length by severing a quantity of the folded mat and encircling or embracing the collected mat with a strip of kraft paper 180 or like material and sealing overlapping portions of the paper as at 181. As shown in Figure 7, the package of mat retroflexed upon itself into a series of folds or laps provides a facile means of packaging a continuous length of fibrous material. The method of compacting and folding the continuous mat forms rectangular-shaped packages which when stacked occupy a minimum of space.

Figure 5:
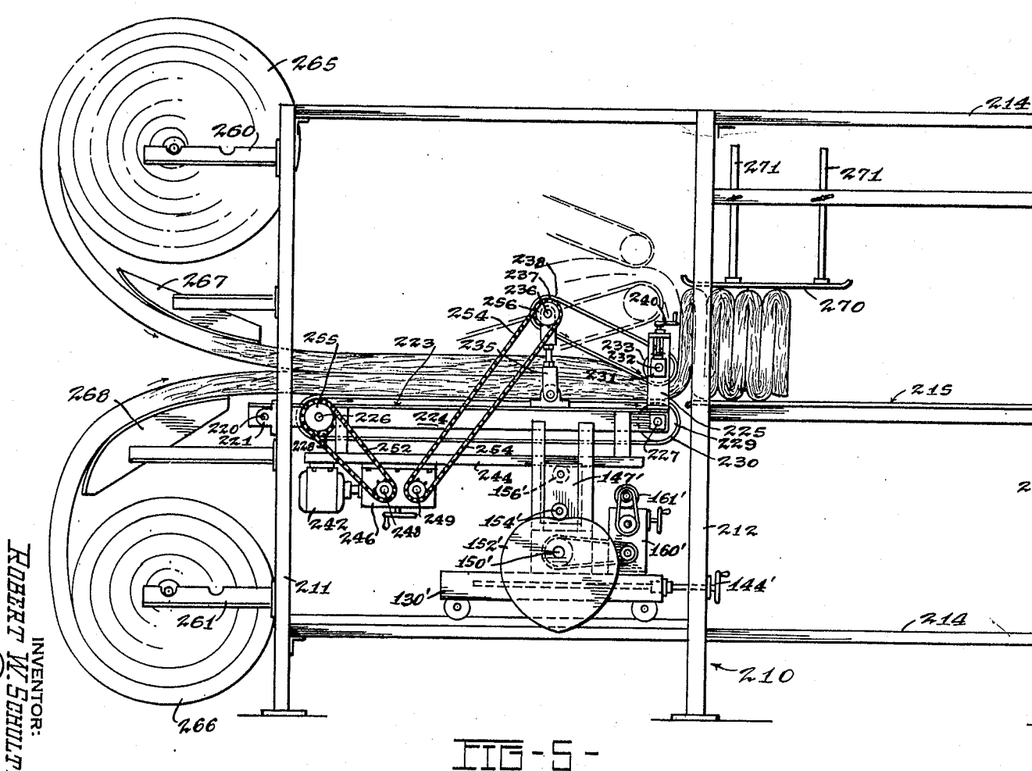
Figure 5 is an elevational view illustrating a modified form of apparatus of the invention.

The method of the invention embraces the folding of a continuous mat in contiguous laps and such folding may be accomplished by causing relative movement between a mat-conveying or advancing means and a mat-receiving and collecting station. Figure 5 illustrates a modified form of apparatus for carrying out the method of the invention wherein the mat-advancing or conveying means is adapted for relative movement to fold the mat and deposit the folded configuration onto a relatively stationary table or collecting surface. This form of apparatus includes a frame 210 formed with pairs of uprights 211, 212 and 213 which are joined by longitudinally extending structural members 214. Disposed between the pairs of uprights 212 and 213 is a mat-receiving zone in the form of a uniplanar surface or table 215 preferably disposed in a horizontal position. In this form of apparatus the table 215 is relatively stationary while the folding of the mat is accomplished by vertical reciprocation or oscillation of the mat-compressing and advancing means relative to the table.

The mat-compressing and advancing means is arranged to pivot about the axis of a supporting shaft 220 journaled in suitable bearing blocks 221 carried by the uprights 211. The mat-advancing means includes a supplemental frame 223 formed with a pair of side members 224 pivoted upon the shaft 220. The frame 223 is also formed at one end with upwardly extending members 225. Journally supported by bearings carried by the side members 224 are shafts 226 and 227 respectively supporting rollers 228 and 229 which form supports for an endless conveyor or belt 230. The members 225 journally support a shaft 232 carrying a roller 233. Adjustable means 235 are mounted upon each of the side members 224 supporting a shaft 236 carrying a roller 237. The rollers 233 and 237 support a second endless conveyor belt 238. The means 235 are adjustable in order to establish the proper tension of the belt 238. The journal means carried by the members 225 supporting the roller 233 may be arranged for vertical adjustment in order to regulate or control the extent or degree of compression and hence the thickness of the mat. Such means may be adjusted by means of a crank 240 having a threaded shaft portion cooperating with the slidable journal blocks 231 to effect the above-mentioned adjustment.

The conveyor means 230 and 238 are driven from a motor 242 supported upon longitudinally extending bars 244 forming part of the frame 223. The motor 242 is operatively connected to variable speed mechanism or gearing contained within a housing 246. Two drive shafts 248 and 249 actuate sprockets and driving chains 252 and 254 connected with sprockets 255 and 256 respectively mounted upon shafts 226 and 236. The shafts 248 and 249 are driven in directions to cause the inner or juxtaposed flights of the conveyors 230 and 238 to be moved in the same direction to advance the mat toward the table 215 providing a mat-collecting zone.

The mat-compressing and advancing means above described is reciprocated or oscillated in a vertical direction about the axis of shaft 229 by means substantially the same as illustrated for causing oscillation of the mat-receiving platen 115 in the form of the invention illustrated in Figures 1 and 4. The means includes a carriage 130' journally supporting a shaft 150' which drives a pair of uniform motion cams 152' from a motor 161' through a speed-controlling mechanism contained in a housing 160'. The crossheads 147' are reciprocated vertically through the engagement of the cam followers 154' with the cams 152', the rollers 156' engaging the longitudinally extending members 244 of the frame 223. The rotation of the cams 152' driven by the motor 161' causes oscillation of the mat-compressing and advancing means about the axis of the supporting shaft 229.

The amplitude of the reciprocation or oscillation of the mat-compressing and advancing means may be varied and controlled by changing the relative position of the carriage 130' through manipulation of the handwheel 144' to change the point of engagement of the rollers 156' with the mat-compressing and advancing means.

The uprights 211 of the frame are provided with pairs of members 260 and 261 adapted to respectively support supplies of fibrous material or mat 265 and 266 which in the form illustrated may be in prerolled condition. It is to be understood that a single mat may be fed through the apparatus if a lesser thickness of folded product is desired. Guide means 267 and 268 may be provided for directing or guiding the mat from the supply rolls to the mat-compressing and advancing conveyors.

During the oscillatory movements of the mat-advancing means, the mat is being fed in a right-hand direction as viewed in Figure 5 by linear movement of the juxtaposed flights of the conveyors 230 and 238, the rates of vertical oscillation and linear travel of the mat being correlated through the speed-changing devices contained in housings 160' and 246 to result in a series of folds and contiguous laps of the mat being deposited or collected upon the table 215 with the laps of the mat extending in a substantially vertical direction. A guide means in the form of a plate 270 adjustably supported upon the frame structure through the medium of adjustably supported rods 271 may be provided above the mat-collecting zone to confine the collected mat as it is formed and aid in frictionally maintaining the mat in its folded formation.

While the arrangement shown in Figure 5 is equipped for supporting supply rolls of mat, it is to be understood that one or more strips or layers may be fed to the apparatus by a conveyor such as that shown at 90 in Figure 1 from a fiber-forming station remotely positioned from the mat-compressing and folding apparatus. Whether the fibrous material supplied to the machine is a continuous strip or in roll form as shown in Figure 5, the material may be pretreated or impregnated with a resin adapted to be cured under the application of heat. Impregnated mat is utilized where the mat is subsequently processed by molding and curing to a predetermined configuration or shape. For certain uses of the folded fibrous material, the impregnating resin may be dispensed with as, for example, when the mat is to be used in unmolded or unbonded form for acoustic or heat insulation or for similar purposes.

It is apparent that, within the scope of the invention, modifications and different arrangements may be made other than is herein disclosed, and the present disclosure is illustrative merely, the invention comprehending all variations thereof.

What I claim is:

1. The method of processing fibrous material including the steps of delivering a mass of fibrous material to a compressing station; concomitantly advancing and compressing the mass of material; delivering the compressed mass to a collecting station, and causing relative oscillatory movement in transverse directions between the compressing station and the collecting station whereby the compressed fibrous material during its advancing movement is successively retroflexed upon itself to form a plurality of contiguous fibrous layers.

2. The method of processing fibrous material including the steps of delivering fibrous material to a material-advancing zone; concomitantly advancing and compacting the material to predetermined thickness; moving the compacted material to a collecting station, and concomitantly causing relative movement in alternate transverse directions between the material-compacting station and the collecting station whereby the compacted material is lapped upon itself in successive contiguous layers.

3. The method of processing mineral fibers including the steps of continuously delivering a fibrous mass to a compressing station; compressing the mass to a reduced thickness to form a mat, and concomitantly delivering the mat to a collecting station and causing relative oscillatory movements between the compressing station and the mat-collecting station in directions transversely of the movement of the mat at the compressing station whereby the compressed mat is successively retroflexed upon itself and collected in a series of contiguous laps of substantially equal length.

4. The method of processing mineral fibers including the steps of continuously delivering a fibrous mass to a compressing station; concomitantly advancing and compressing the mass to a reduced thickness to form a mat; advancing the compressed mat toward a collecting station, and concomitantly effecting relative transverse reciprocatory movement between the compressing station and the mat-collecting station whereby the compressed mat is successively retroflexed upon itself and collected in a series of contiguous layers without interrupting the continuity of the mat.

5. The method of producing corrugated sections of fibrous material which includes the steps of conveying a binder-impregnated mass of fibers to a compressing station; compressing the mass of fibers to a dense mat formation; advancing the mat to a collecting station; effecting successive lateral movements of one of said stations alternately in opposite directions to fold the mat in a series of contiguous layers; depositing a section of the folded mat in a matrix of sinuous configuration, and curing the binder in the material to fix the sinuous configuration in the mat.

6. The method of producing pipe-covering sections from fibrous material which includes the steps of conveying a mass of fibers impregnated with uncured binder to a compressing station; compressing the mass of fibers to form a mat of substantially uniform thickness; advancing the mat to a collecting station; effecting successive lateral movements of one of said stations relative to the other for folding the compressed mat successively upon itself to form a series of contiguous layers; depositing a quantity of the folded mat in a matrix of sinuous shape and curing the binder in the material to fix the sinuous configuration in the mat, and of severing the sinuous-shaped mat to form a plurality of semiannular sections.

7. Apparatus for processing fibers including, in combination, means for advancing a mat of interfelted fibers; means including a platen for receiving and supporting the mat of fibers from the mat-advancing means, and means for causing relative oscillatory movement between the mat-advancing means and the mat-receiving means in alternate transverse directions whereby the mat is folded upon itself in a series of contiguous layers.

8. Apparatus for processing fibers including, in combination, means for compacting a mass of interfelted fibers to form a mat of substantially uniform thickness; means for receiving and supporting the mat of fibers from the fiber-compacting means, and means for effecting relative oscillatory movement between the fiber-compacting means and the mat-receiving means whereby the mat is successively retroflexed in alternate transverse directions and assembled in a series of contiguous layers.

9. Apparatus for processing fibers including, in combination, means for simultaneously advancing and compressing a mass of interfelted fibers to form a mat; means including a platen for receiving and supporting the compressed mat of fibers from the fiber-compressing means, and means for effecting relative transverse movement alternately in opposite directions between the fiber-compressing means and the mat-receiving platen during advancing movement of the mat whereby the compressed mat is successively folded upon itself in a series of contiguous layers.

10. Apparatus of the character disclosed including, in combination, a mat-advancing means; a mat-receiving means, one of said means being movable in alternate transverse directions relative to the other to fold a mat into a succession of contiguous laps; driving means for the mat-advancing means; driving means for effecting the relative movement in transverse directions of one of said means, and speed-control mechanism for both said driving means to selectively control the rate of movement of the transversely movable means and the mat-advancing speed of the mat-advancing means.

11. Apparatus of the character disclosed including, in combination, a mat-advancing means including a pair of conveyor belts; a mat-receiving means including a platen; one of said means being relatively movable in alternate transverse directions with respect to the other to fold a mat into a plurality of contiguous laps; driving means for moving the conveyor belts of the mat-advancing means, a second driving means for effecting the relative transverse movement of one of said means with respect to the other, both said driving means being arranged to control respectively the extent of transverse movement of the relatively movable means and the rate of movement of the conveyor belts.

12. Apparatus of the character disclosed including, in combination, a mat-conveying means; a mat-receiving means; driving means for moving one of said means relative to the other in transverse directions to fold the mat into a plurality of contiguous layers; a second driving means for the mat-conveying means, and speed-regulating means associated with each of said driving means for controlling the extent of movement of the relatively movable means and the speed of the mat-conveying means.

13. Apparatus for assembling a fibrous mat into a series of contiguous laps including, in combination, a mat-collecting station; means for advancing fibrous mat to the collecting station, said mat-advancing means being adjustable to regulate the thickness of the mat; means for causing relative lateral movement between the mat-collecting station and the mat-advancing means for delivering the mat at the collecting station in a series of contiguously arranged layers, and means for varying the amplitude of lateral movement between the mat-collecting station and the mat-advancing means for changing the size of the contiguous layers of the collected mat.

14. Apparatus for assembling a fibrous mat into a compact series of contiguous laps including, a combination, a mat-collecting station; a conveyor for advancing fibrous mat to the collecting station, said conveyor being disposed to compress the mat to a predetermined thickness as the mat is advanced thereby; means for causing relative movement between the mat-collecting station and the mat-conveying means for delivering the mat at the collecting station in a series of contiguously arranged, connected layers, and means for varying the amplitude of movement between the mat-collecting station and the mat conveyor for varying the size of the contiguous layers of the compressed mat.

15. Apparatus for assembling a fibrous mat into a compact series of contiguous laps including, in combination, a mat-collecting platen; a pair of movable conveyor belts for advancing fibrous mat to the mat-collecting platen; said conveyor belts being disposed to compress the mat to predetermined thickness as the mat is advanced thereby, and means for causing lateral movement of the mat-collecting platen relative to the mat-conveying belts for intermittently retroflexing the mat upon itself to form a series of contiguously arranged laps.

16. Apparatus of the character disclosed in combination, means for advancing a fibrous mat including spaced conveyors, means for adjusting one of said conveyors with respect to the other for controlling the thickness of the mat passing between conveyors, means for driving said conveyors, speed-regulating means associated with said conveyor-driving means for controlling the rate of speed of said conveyors, a mat-receiving platen, means for causing relative lateral movement between the mat-advancing means and the mat-receiving platen whereby the mat is assembled upon the platen in a series of contiguous laps, and means for regulating the amplitude of relative movement between the mat-advancing means and the mat-receiving platen for determining the length of the contiguous laps in the assembled mat.

17. Apparatus of the character disclosed in combination, means for conveying a fibrous mat including spaced belt conveyors, means for adjusting the position of one of said conveyors with respect to the other for controlling the thickness of the mat passing between the belt conveyors, means for driving said belt conveyors, speed-regulating means associated with said drive means for controlling the rate of speed of said conveyors, a mat-receiving platen, and means for causing lateral movement of the mat-conveying means relative to the mat-receiving platen whereby the advancing mat is accumulated upon the platen in a series of contiguous laps.

18. Apparatus of the character disclosed in combination, means for conveying a fibrous mat including spaced endless belt conveyors, means for adjusting the space between the conveyors for controlling the thickness of the mat passing between conveyors, means for driving said conveyors, speed-regulating means associated with said drive means for controlling the rate of speed of said conveyors, a relatively stationary mat-receiving platen, means for causing oscillatory movement of the mat-conveying means whereby the advancing mat is accumulated upon the platen in a series of contiguous laps, and means for regulating the amplitude of oscillatory movement of the mat-conveying means for determining the length of the contiguous laps in the lapped mat.

References Cited in the file of this patent

UNITED STATES PATENTS

| Number | Name | Date |
|---|---|---|
| 1,468,028 | Maussner et al. | Sept. 18, 1923 |
| 1,656,828 | Powell | Jan. 17, 1928 |
| 2,016,290 | Morris | Oct. 8, 1935 |
| 2,288,072 | Collins | June 30, 1942 |
| 2,500,690 | Lannan | Mar. 14, 1950 |